United States Patent
Liu et al.

(10) Patent No.: US 11,482,360 B2
(45) Date of Patent: Oct. 25, 2022

(54) STATOR SECONDARY WINDINGS TO MODIFY A PERMANENT MAGNET (PM) FIELD

(71) Applicant: The Boeing Company, Chicago, IL (US)

(72) Inventors: Shengyi Liu, Sammamish, WA (US); Lijun Gao, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/839,702

(22) Filed: Dec. 12, 2017

(65) Prior Publication Data

US 2019/0180899 A1    Jun. 13, 2019

(51) Int. Cl.
*H01F 7/02*    (2006.01)
*H02K 1/14*    (2006.01)
(Continued)

(52) U.S. Cl.
CPC .............. *H01F 7/0278* (2013.01); *H02K 1/14* (2013.01); *H02K 19/12* (2013.01); *H02K 21/042* (2013.01);
(Continued)

(58) Field of Classification Search
CPC .......... H01F 7/0278; H02P 25/22; H02P 9/48; H02P 29/027; H02P 2103/20;
(Continued)

(56) References Cited

U.S. PATENT DOCUMENTS

| 8,836,256 B2 | 9/2014 | Vilar et al. |
| 2005/0029890 A1* | 2/2005 | Kadoya ................. H02K 21/16 310/180 |

(Continued)

FOREIGN PATENT DOCUMENTS

| CN | 101630873 B | 1/2011 |
| CN | 101626186 B | 9/2011 |

(Continued)

OTHER PUBLICATIONS

Ptdesign, www.motionsystemdesign.com, Jul. 2000.*
(Continued)

*Primary Examiner* — John K Kim
(74) *Attorney, Agent, or Firm* — Haynes and Boone, LLP

(57) ABSTRACT

Systems, methods, and apparatus for secondary windings to modify a permanent magnet (PM) field of a permanent magnet synchronous generator (PMSG) are disclosed. In one or more embodiments, a disclosed system for a PMSG comprises a permanent magnet (PM) of the PMSG to rotate and to generate a permanent magnet field. The system further comprises a plurality of stator primary windings (SPW), of the PMSG, to generate primary currents from the permanent magnet field. Further, the system comprises a plurality of stator secondary windings (SSW), of the PMSG, to draw secondary currents from a power source, and to generate a stator secondary winding magnetic field from the secondary currents. In one or more embodiments, the permanent magnet field and the stator secondary winding magnetic field together create an overall magnetic field for the PMSG.

20 Claims, 11 Drawing Sheets

(51) Int. Cl.
  *H02K 19/12* (2006.01)
  *H02K 21/04* (2006.01)
  *H02K 21/46* (2006.01)
  *H02P 9/48* (2006.01)
  *H02P 25/22* (2006.01)
  *H02P 29/024* (2016.01)
  *H02P 103/20* (2016.01)

(52) U.S. Cl.
  CPC ............... *H02K 21/46* (2013.01); *H02P 9/48* (2013.01); *H02P 25/22* (2013.01); *H02P 29/027* (2013.01); H02K 2213/03 (2013.01); H02P 2103/20 (2015.01); H02P 2207/055 (2013.01)

(58) Field of Classification Search
  CPC .. H02P 2207/055; H02K 19/12; H02K 21/46; H02K 21/042; H02K 1/14; H02K 2213/03
  USPC ..................................... 310/156.01, 179, 183
  See application file for complete search history.

(56) References Cited

U.S. PATENT DOCUMENTS

| | | | |
|---|---|---|---|
| 2006/0273682 A1 | 12/2006 | Kawamura | |
| 2008/0272664 A1 | 11/2008 | Flynn | |
| 2012/0249044 A1* | 10/2012 | Linda | B60L 15/10 318/722 |
| 2013/0049511 A1 | 2/2013 | Nishimura | H02K 1/2753 310/156.28 |
| 2013/0134918 A1* | 5/2013 | Richards | H02P 6/28 318/490 |
| 2013/0220727 A1* | 8/2013 | Suzuki | B62D 5/046 180/443 |
| 2013/0241452 A1* | 9/2013 | Suzuki | B62D 5/0403 318/400.15 |
| 2014/0001987 A1* | 1/2014 | Okada | B60L 7/10 318/370 |
| 2014/0132190 A1* | 5/2014 | Kitano | B60L 15/007 318/400.22 |
| 2015/0123578 A1* | 5/2015 | Schulz | H02P 23/14 318/400.04 |
| 2015/0200044 A1* | 7/2015 | Endo | H01F 7/021 310/156.01 |
| 2016/0049854 A1* | 2/2016 | Ny | B60L 50/12 74/DIG. 9 |
| 2016/0375774 A1* | 12/2016 | Lauter | B60L 3/04 318/400.22 |
| 2017/0040879 A1* | 2/2017 | Levesque | H02K 3/28 |
| 2017/0279391 A1* | 9/2017 | Freire | H02P 9/42 |
| 2018/0086369 A1* | 3/2018 | Yanagi | B62D 5/049 |
| 2019/0180899 A1* | 6/2019 | Liu | H02P 9/48 |

FOREIGN PATENT DOCUMENTS

| | | |
|---|---|---|
| CN | 101582672 B | 3/2013 |
| CN | 205509809 U | 8/2016 |
| EP | 3223422 | 9/2017 |
| JP | 5289572 B2 | 9/2013 |
| TW | 1572116 B | 2/2017 |

OTHER PUBLICATIONS

• AN70614, "Understanding Regeneration", Nidec Motor Corporation, Rev 0.1, Jun. 14, 2007 (Year: 2007).*
"Field-Weakening Control", Mathworks, https://www.mathworks.com/solutions/power-electronics-control/field-weakening-control.html, printed on Feb. 16, 2022.*

* cited by examiner

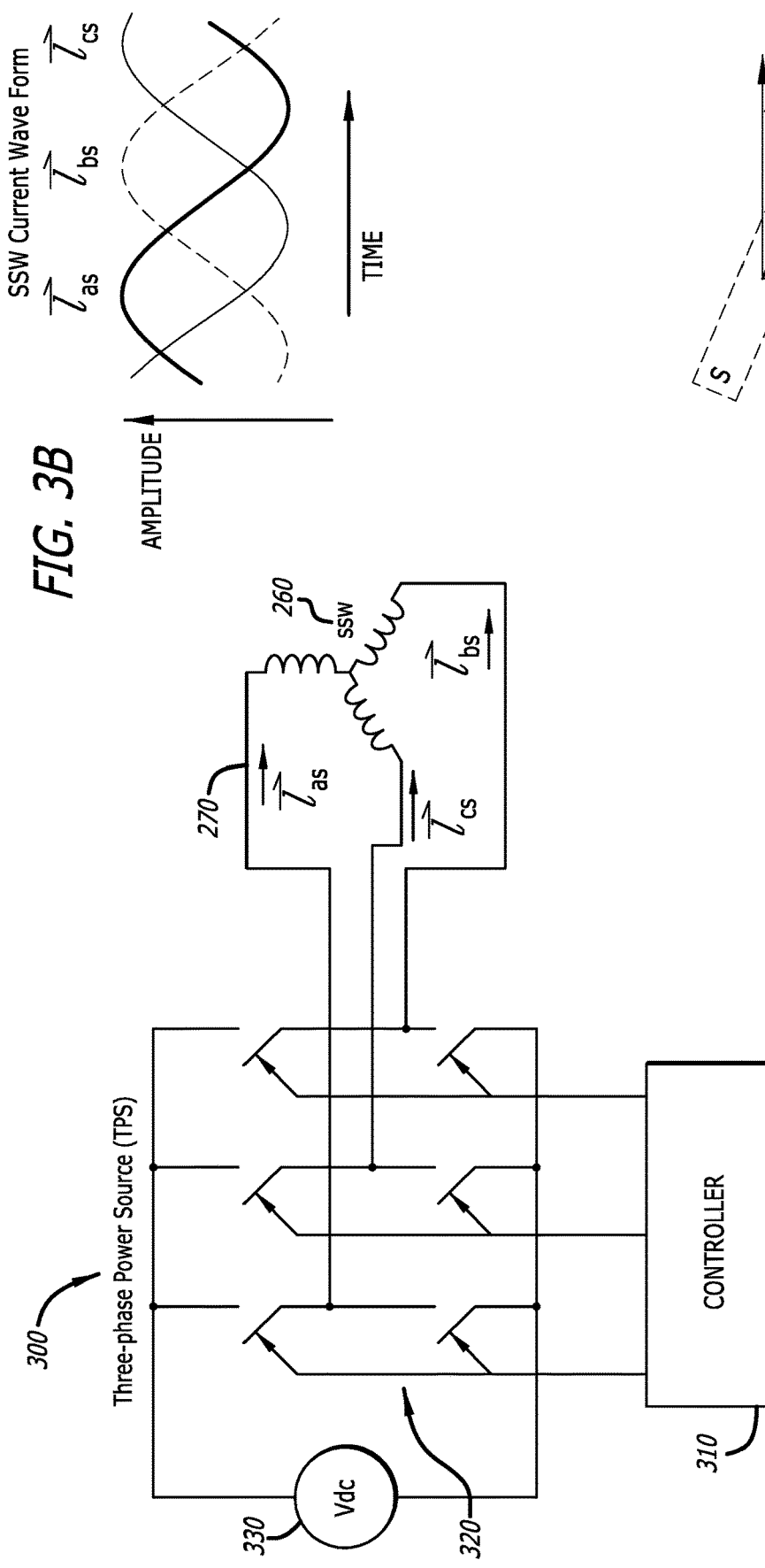
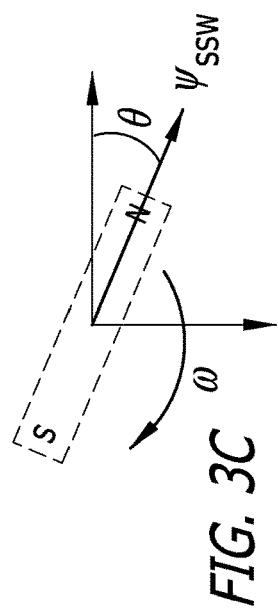
FIG. 3B
FIG. 3C
FIG. 3A

STATOR SECONDARY WINDINGS TO MODIFY A PERMANENT MAGNET (PM) FIELD

FIELD

The present disclosure relates to permanent magnet synchronous generators (PMSGs). In particular, it relates to stator secondary windings to modify a permanent magnet (PM) field of PMSGs.

BACKGROUND

In a permanent magnet synchronous generator (PMSG), a permanent magnet (PM), which is mounted on a rotor coupled to a shaft of a machine, generates a constant magnet field. In the case of a short circuit fault, a fixed permanent magnet field strength will keep energizing the stator windings of the generator as long as the rotor rotates, thereby resulting in a continued and large short-circuit current until the machine completely stops. This continued and large short-circuit current can cause significant damage to the generator, potentially disabling the generator.

Currently, a conventional method used for generator short circuit protection is the employment of a line-installed circuit breaker of a thermal-magnetic type. The disadvantage of using this type of circuit breaker is that the thermal effect requires a relatively long time to activate. Additionally, this circuit breaker is also subject to malfunctioning. In both of these cases, the circuit breaker may fail to protect the generator.

As such, there is a need for an improved design for generator short circuit protection.

SUMMARY

The present disclosure relates to a method, system, and apparatus for secondary windings to modify a permanent magnet (PM) field of a permanent magnet synchronous generator (PMSG). In one or more embodiments, a method for a permanent magnet synchronous generator (PMSG) comprises rotating a permanent magnet (PM) of the PMSG. The method further comprises generating, from the permanent magnet rotating, a permanent magnet field. In one or more embodiments, the permanent magnet field couples through a plurality of stator primary windings (SPW) of the PMSG. Also, the method comprises generating, by the stator primary windings, primary currents from the permanent magnet field. In addition, the method comprises drawing, by a plurality of stator secondary windings (SSW) of the PMSG, secondary currents from a power source. Further, the method comprises generating, by the stator secondary windings, a stator secondary winding magnetic field from the secondary currents. In one or more embodiments, the permanent magnet field and the stator secondary winding magnetic field together create an overall magnetic field for the PMSG.

In at least one embodiment, the stator secondary winding magnetic field counteracts, weakens, or strengthens the permanent magnet field. In some embodiments, the permanent magnet is mounted onto a rotor. In one or more embodiments, the primary currents are three-phase currents. In at least one embodiment, the power source is a three-phase power source (TPS). In some embodiments, the secondary currents are three-phase sinusoidal currents or three-phase quasi-sinusoidal currents.

In one or more embodiments, the power source comprises a controller, a plurality of switches, and a direct current (DC) power source. In some embodiments, the switches form an inverter. In at least one embodiment, the method further comprises comparing, by the controller, load currents to referenced maximum currents. In some embodiments, the method further comprises generating, by the controller, a plurality of pulse sequences, when the load currents are greater than the maximum currents. In one or more embodiments, the method further comprises switching, the plurality of switches, by using the pulse sequences to produce the secondary currents.

In at least one embodiment, a system for a permanent magnet synchronous generator (PMSG) comprises a permanent magnet (PM) of the PMSG to rotate and to generate a permanent magnet field. The system further comprises a plurality of stator primary windings (SPW), of the PMSG, to generate primary currents from the permanent magnet field. Also, the system comprises a plurality of stator secondary windings (SSW), of the PMSG, to draw secondary currents from a power source, and to generate a stator secondary winding magnetic field from the secondary currents. In one or more embodiments, the permanent magnet field and the stator secondary winding magnetic field together create an overall magnetic field for the PMSG.

In one or more embodiments, the controller is to compare load currents to maximum currents. In some embodiments, the controller is to generate a plurality of pulse sequences, when the load currents are greater than the maximum currents. In at least one embodiment, the plurality of switches is to be switched by using the pulse sequences to generate the secondary currents.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 3A is a diagram of an exemplary three-phase power source (TPS) that may be employed for use with the disclosed permanent magnet synchronous generator (PMSG) of FIG. 2, in accordance with at least one embodiment of the present disclosure.

FIG. 3B is a graph showing exemplary sinusoidal currents that may be generated by the three-phase power source (TPS) of FIG. 3A, in accordance with at least one embodiment of the present disclosure.

FIG. 3C is a graph showing an exemplary stator secondary winding magnetic field ($\psi_{SSW}$) generated by the stator secondary windings (SSW) of the permanent magnet synchronous generator (PMSG) of FIG. 2, in accordance with at least one embodiment of the present disclosure.

DESCRIPTION

Figure 1:
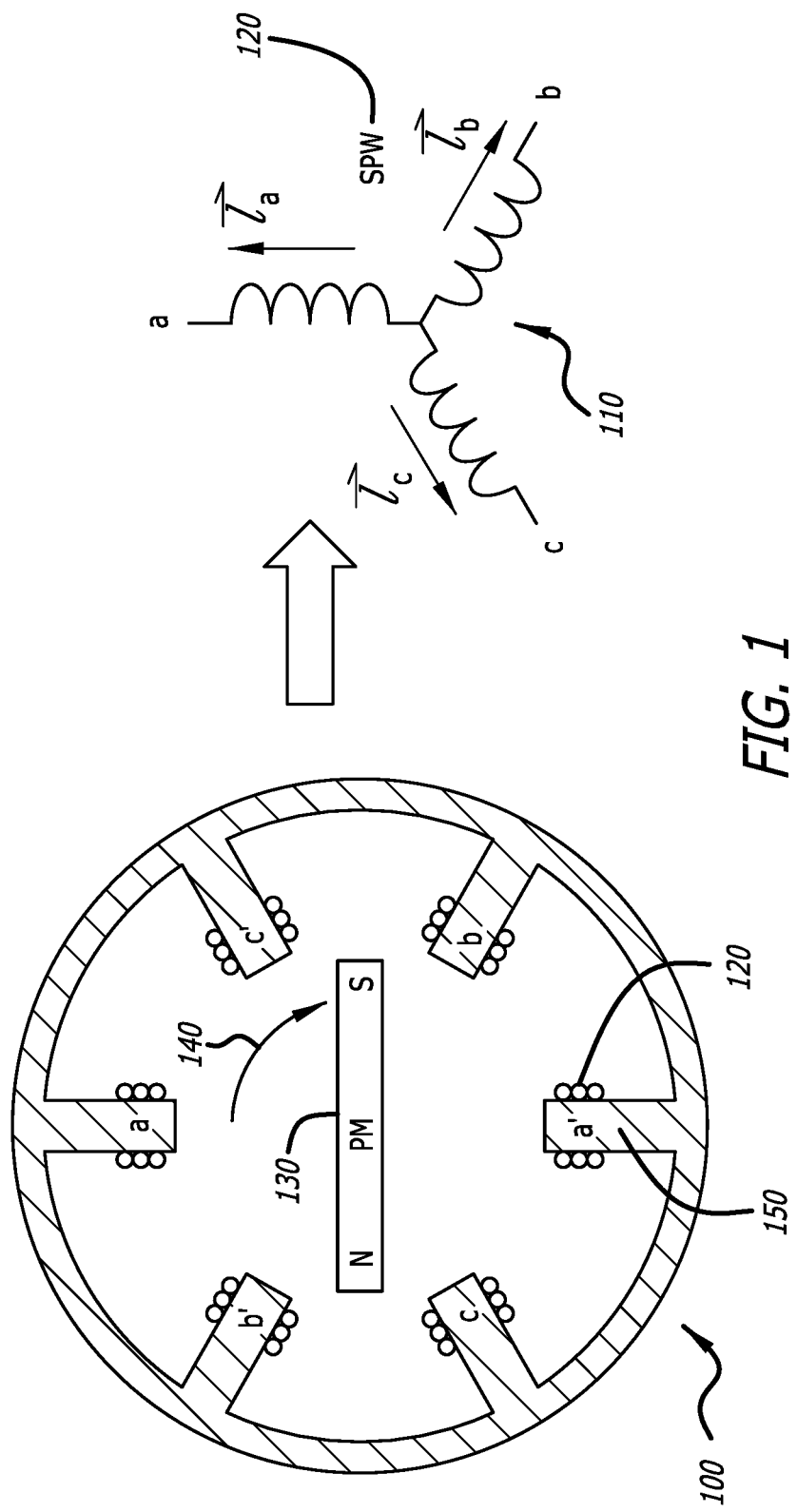
FIG. 1 is a diagram showing a conventional permanent magnet synchronous generator (PMSG) along with three-phase currents generated by its stator primary windings (SPW).

The methods and apparatus disclosed herein provide an operative system for secondary windings to modify a permanent magnet (PM) field of a permanent magnet synchronous generator (PMSG). In one or more embodiments, the system of the present disclosure allows for a design and control method of stator secondary windings (SSW) to modify the permanent magnet field of a permanent magnet synchronous generator. In particular, the disclosed system employs stator secondary windings within a permanent magnet synchronous generator. In at least one embodiment, the stator secondary windings generate a magnetic field to (1) counteract the permanent magnet field of the permanent magnet synchronous generator to provide protection to the generator from a short circuit (SC) fault. In some embodiments, the stator secondary windings generate a magnetic field to (2) weaken or (3) strengthen the permanent magnet field of the permanent magnet synchronous generator. Specifically, the stator secondary windings allow for the control of the permanent magnet main field flux linkage, in terms of both timing and value, for short circuit fault protection as well as for field weakening or strengthening.

As previously mentioned above, in a PMSG, a permanent magnet, which is mounted on a rotor coupled to a shaft of a machine, generates a constant magnet field. In the case of a short circuit fault, the fixed permanent magnet field strength will keep energizing the stator windings (i.e. stator primary windings) of the generator as long as the rotor rotates, thereby resulting in a continued and large short-circuit current until the machine completely stops. This continued and large short-circuit current can cause significant damage to the generator, and potentially disable the generator.

A conventional method, currently used, for generator short circuit protection is the implementation of a line-installed circuit breaker of a thermal-magnetic type. The drawback of using this type of circuit breaker is that the thermal effect requires a relatively long time to activate. In addition, this circuit breaker is also subject to malfunctioning. In both of these cases, the circuit breaker may fail to protect the generator. The system of the present disclosure implements stator secondary windings (SSW) in a permanent magnet synchronous generator to generate a magnetic field to counteract the permanent magnet field of the generator to protect the generator from a short circuit fault.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to generators, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram showing a conventional permanent magnet synchronous generator (PMSG) 100 along with three-phase currents 110 generated by its stator primary windings (SPW) 120. In this figure, the PMSG 100 is circular in shape and comprises a plurality of bars 150. In this figure, the PMSG 100 comprises six (6) bars 150. Three (3) pairs of stator primary windings (SPW) 120 are constructed on the six (6) bars 150 to form phase A winding (a-a'), phase B winding (b-b'), and phase C winding (c-c'). Each winding comprises two (2) coils (e.g., phase A winding comprises coil a and coil a'), and each coil can comprises multiple turns (though three (3) turns per coil are shown as an example in FIG. 1). Also, in FIG. 1, the left diagram depicts a physical diagram of the PMSG 100, and the right diagram shows an electrical symbol for the three-phase stator primary windings 120.

The PMSG 100 also comprises a permanent magnet (PM) 130. The permanent magnet 130 is mounted onto a rotor (not shown) coupled to a shaft of a primary mover (e.g., a machine) (not shown). The permanent magnet 130 is depicted to be in the form of an elongated bar with a north end (labeled "N") and a south end (labeled "S"). It should be noted that the permanent magnet 130 may be manufactured to be of various different shapes than an elongated bar as is depicted in FIG. 1. In addition, it should be noted that the permanent magnet 130 may comprise more than one pair of poles (e.g., a north end and a south end) than as shown in FIG. 1.

As the machine is operating, the rotor rotates in the direction of arrow 140 and, in turn, also rotates the permanent magnet 130 accordingly. The spinning of the permanent magnet 130 creates a fixed excitation magnetic field (e.g., a permanent magnet field) ($\vec{\psi}_{PM}$). This fixed excitation magnetic field (e.g., a permanent magnet field) ($\vec{\psi}_{PM}$) couples (i.e. radiates) through the coils of the stator primary windings 120, thereby causing the stator primary windings 120 to generate three-phase currents (e.g., primary currents) 110. It should be noted that the overall magnetic field (for the PMSG 100 comprises only the permanent magnet field ($\vec{\psi}_{gen}$, $\vec{\psi}_{SSW}$).

Figure 2:
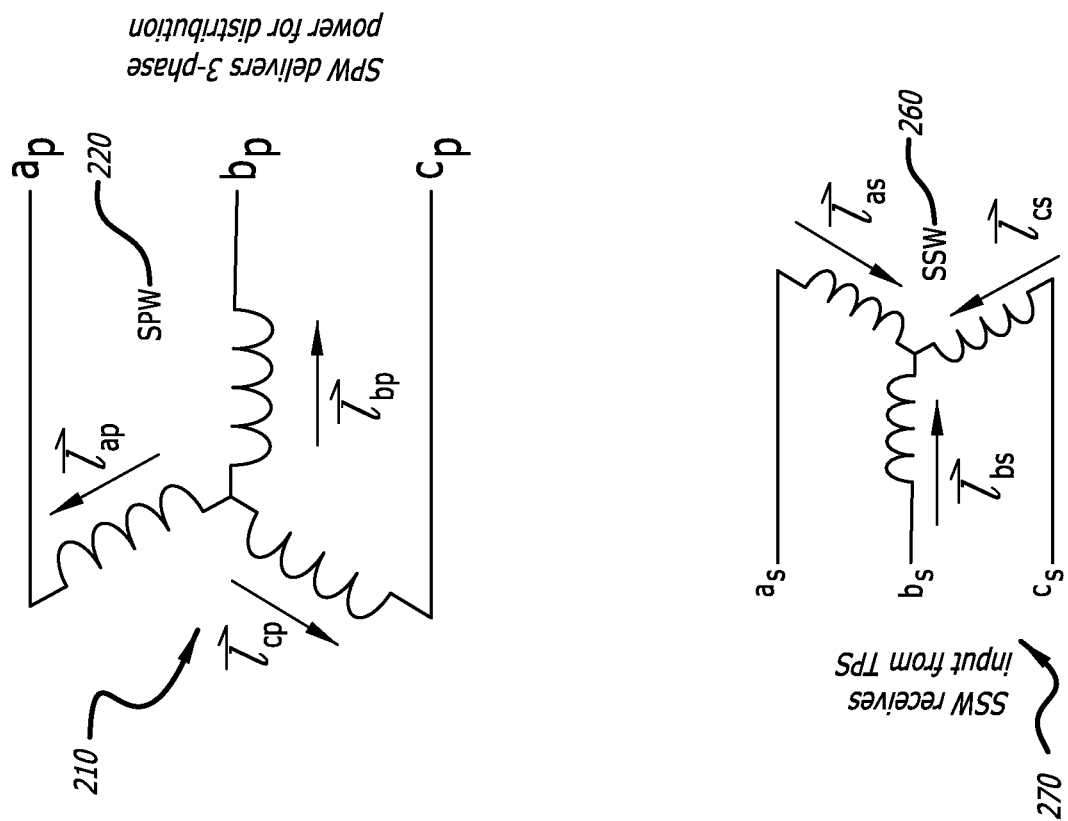
FIG. 2 is a diagram showing the disclosed permanent magnet synchronous generator (PMSG), which employs stator secondary windings (SSW), along with three-phase currents generated by its stator primary windings (SPW) as well as a three-phase currents drawn by its stator secondary windings (SSW), in accordance with at least one embodiment of the present disclosure.
Figure 2:
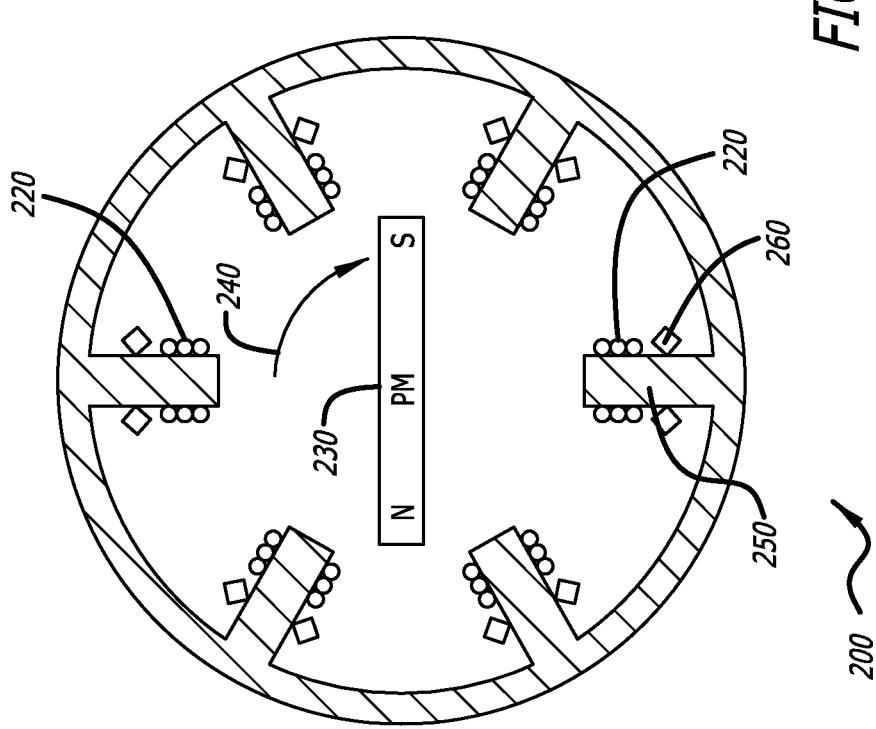

FIG. 2 is a diagram showing the disclosed permanent magnet synchronous generator (PMSG) 200, which employs stator secondary windings (SSW) 260, along with three-phase currents 210 generated by its stator primary windings (SPW) 220 as well as three-phase currents 270 drawn by its stator secondary windings (SSW) 260, in accordance with at least one embodiment of the present disclosure. The disclosed PMSG 200 of FIG. 2 is similar to the conventional PMSG 100 of FIG. 1 except that the disclosed PMSG 200 additionally comprises stator secondary windings 260.

In this figure, the PMSG 200 is circular in shape and comprises a plurality of bars 250. In this figure, the PMSG 200 comprises six (6) bars 250. It should be noted that in other embodiments, the PMSG 200 may comprise more or less bars 250 than the six bars 250 that are shown in FIG. 2. Three (3) pairs of stator primary windings (SPW) 220 are constructed on the six (6) bars 250 to form phase A winding (a-a'), phase B winding (b-b'), and phase C winding (c-c'). Each winding comprises two (2) coils (e.g., phase A winding comprises coil a and coil a'), and each coil can comprises multiple turns (though three (3) turns per coil are shown as an example in FIG. 2).

Also in this figure, Three (3) pairs of stator secondary windings (SSW) 260 are constructed on the six (6) bars 250 to form phase A winding (a-a'), phase B winding (b-b'), and phase C winding (c-c'). Each winding comprises two (2) coils (e.g., phase A winding comprises coil a and coil a'), and each coil can comprises multiple turns (though one (1) turn per coil is shown as an example in FIG. 2).

Also, in FIG. 2, the left diagram depicts a physical diagram of the PMSG 100, the upper-right diagram shows an electrical symbol for the three-phase stator primary windings 220, and the lower-right diagram shows an electrical symbol for the three-phase stator secondary windings 260.

The PMSG 200 also comprises a permanent magnet (PM) 230. The permanent magnet 230 is mounted onto a rotor (not shown) coupled to a shaft of a primary mover (e.g., a machine) (not shown). In one or more embodiments, the machine may be a motor or engine of a vehicle, such as an airborne vehicle (e.g., an aircraft), a terrestrial vehicle (e.g., a truck or car), or a marine vehicle (e.g., a ship or boat). The permanent magnet 230 is depicted to be in the form of an elongated bar with a north end (labeled "N") and a south end (labeled "S"). It should be noted that, in one or more embodiments, the permanent magnet 230 may be manufactured to be of various different shapes than an elongated bar as is depicted in FIG. 2. In addition, it should be noted that the permanent magnet 230 may comprise more than one pair of poles (e.g., a north end and a south end) than as shown in FIG. 2.

As the machine is operating, the rotor rotates in the direction of arrow 240 and, in turn, also rotates the permanent magnet 230 accordingly. The spinning of the permanent magnet 230 creates a fixed excitation magnetic field (e.g., a permanent magnet field) ($\vec{\psi}_{PM}$). This fixed excitation magnetic field (e.g., a permanent magnet field) ($\vec{\psi}_{PM}$) couples (i.e. radiates) through the coils of the stator primary windings 220, thereby causing the stator primary windings 220 to generate three-phase currents (e.g., primary currents) 210.

Also, during operation, the stator primary windings 220 generate three-phase currents (e.g., primary currents) 210 for power distribution. The stator secondary windings 260 of the PMSG 200 draw three-phase currents (e.g., secondary currents) 270 from a power source (e.g., refer to 300 of FIGS. 3A and 6A). Details regarding the operation of an exemplary power source will discussed below in the description of FIGS. 6A and 6B.

The three-phase currents (e.g., secondary currents) 270 are specially tuned three-phase sinusoidal currents (e.g., refer to FIG. 3B) or three-phase quasi-sinusoidal currents. The three-phase currents (e.g., secondary currents) 270 injected into the stator secondary windings 260 create a rotating magnetic field that couples with the stator primary windings 220 to produce a stator secondary winding magnetic field ($\vec{\psi}_{SSW}$). The permanent magnet field ($\vec{\psi}_{PM}$) and the stator secondary winding magnetic field ($\vec{\psi}_{SSW}$) together create an overall magnetic field ($\psi_{gen}$) for the PMSG 200. It should be noted that, in one or more embodiments, the stator secondary winding magnetic field ($\vec{\psi}_{SSW}$) will either cancel out, add to, or subtract from the permanent magnet ($\vec{\psi}_{PM}$) field to modify (e.g., to counteract, to strengthen, or to weaken) an initial overall magnetic field ($\vec{\psi}_{gen}$) of the PMSG 200, which comprises only the permanent magnet field ($\vec{\psi}_{PM}$).

It should be noted that if the PMSG 200 is manufactured to comprise more or less bars 250 than the six bars 250 that are shown in FIG. 2, the primary currents 210, the secondary currents 270, and the power source (e.g., refer to 300 of FIGS. 3A and 6A) may each comprise more or less than three-phases. Specifically, the primary currents 210, the secondary currents 270, and the power source (e.g., refer to 300 of FIGS. 3A and 6A) will each comprise a number of phases equal to half of the number of bars 250 of the PMSG 200. For example, if the PMSG 200 is manufactured to comprise eight (8) bars, then the primary currents 210, the secondary currents 270, and the power source will each comprise four-phases.

FIG. 3A is a diagram of an exemplary three-phase power source (TPS) 300 that may be employed for use with the disclosed permanent magnet synchronous generator (PMSG) 200 of FIG. 2, in accordance with at least one embodiment of the present disclosure. In this figure, the stator secondary windings 260 of the PMSG 200 are connected to the three-phase power source 300. The three-phase power source 300 comprises a controller 310, a plurality of switches (e.g., six switches) 320, and a voltage source (e.g., a direct current voltage source (Vdc)) 330. It should be noted that in other embodiments, the number of switches of the plurality of switches 320 may be less than or more than the number of switches (i.e. six switches) as shown in FIG. 3A.

During operation of the three-phase power source 300, while the voltage source 330 supplies voltage, the controller 310 commands the plurality of switches 320 to switch. The switching of the plurality of switches 320 produces three-phase currents (e.g., secondary currents) 270 that are drawn by the stator secondary windings 260 of the PMSG 200. The three-phase currents (e.g., secondary currents) 270 comprises three sinusoidal currents (refer to FIG. 3B) that are offset in time by one-third of the period.

FIG. 3B is a graph showing exemplary sinusoidal currents that may be generated by the three-phase power source (TPS) 300 of FIG. 3A, in accordance with at least one embodiment of the present disclosure. In particular, this figure shows exemplary sinusoidal waveforms of the three-phase currents (e.g., secondary currents) 270 that is generated by the three-phase power source (TPS) 300. On this graph, the x-axis denotes time, and the y-axis denotes amplitude in volts.

During operation of the PMSG 200 (refer to FIG. 2), once the three-phase currents (e.g., secondary currents) 270 are drawn by the stator secondary windings 260, the energized stator secondary windings 260 create a spatially rotating magnetic field (i.e. the stator secondary winding magnetic field) ($\vec{\psi}_{SSW}$) (refer to FIG. 3C).

FIG. 3C is a graph showing an exemplary stator secondary winding magnetic field ($\vec{\psi}_{SSW}$) generated by the stator secondary windings (SSW) 260 of the permanent magnet synchronous generator (PMSG) of FIG. 2, in accordance with at least one embodiment of the present disclosure. In this figure, the stator secondary winding magnetic field ($\vec{\psi}_{SSW}$) is the flux linkage phasor of the stator secondary windings 260, where ω is the rotor speed and θ is the rotor position angle.

Figure 4A:
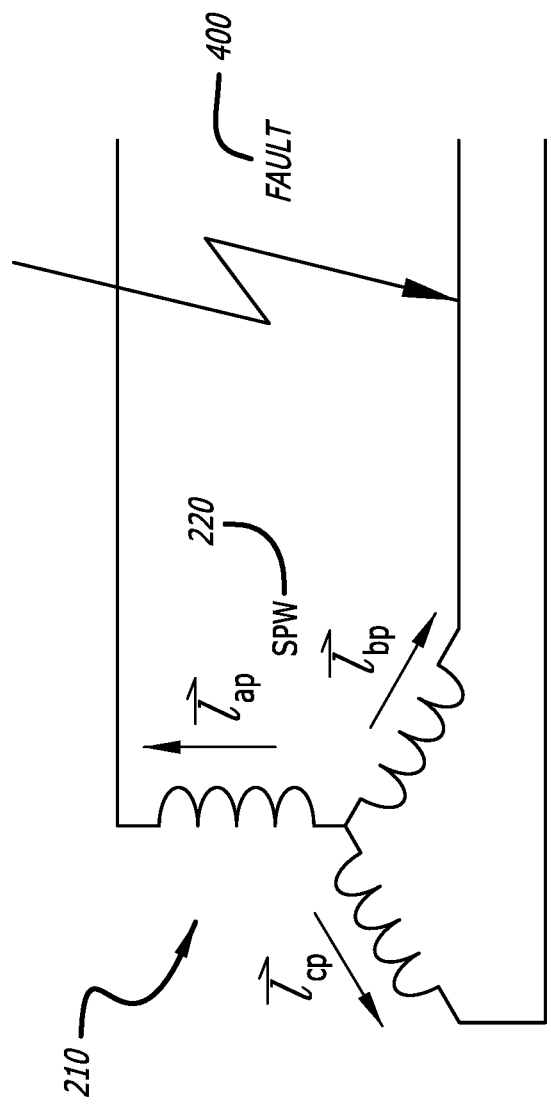
FIG. 4A is a schematic diagram showing the disclosed permanent magnet synchronous generator (PMSG) of FIG. 2 experiencing a short circuit (SC) fault, in accordance with at least one embodiment of the present disclosure.

FIG. 4A is a schematic diagram showing the disclosed permanent magnet synchronous generator (PMSG) 200 of FIG. 2 experiencing a short circuit (SC) fault 400, in accordance with at least one embodiment of the present disclosure. In one or more embodiments, during operation, the PMSG 200 experiences a phase-to-phase short circuit fault 400. In other cases, at least one of the stator primary windings 220 experiences a short circuit to ground (i.e. phase-to-ground short circuit). When the PMSG 200 experiences a short circuit fault 400, the disclosed system can provide short circuit protection to the PMSG 200 by having the stator secondary windings 260 produce a stator secondary winding magnetic field ($\vec{\psi}_{SSW}$) that counteracts the permanent magnetic field ($\vec{\psi}_{PM}$) produced by the permanent magnet such that the overall magnetic field ($\vec{\psi}_{gen}$) of the PMSG 200 is equal to zero (0) (refer to FIG. 4B).

Figure 4B:
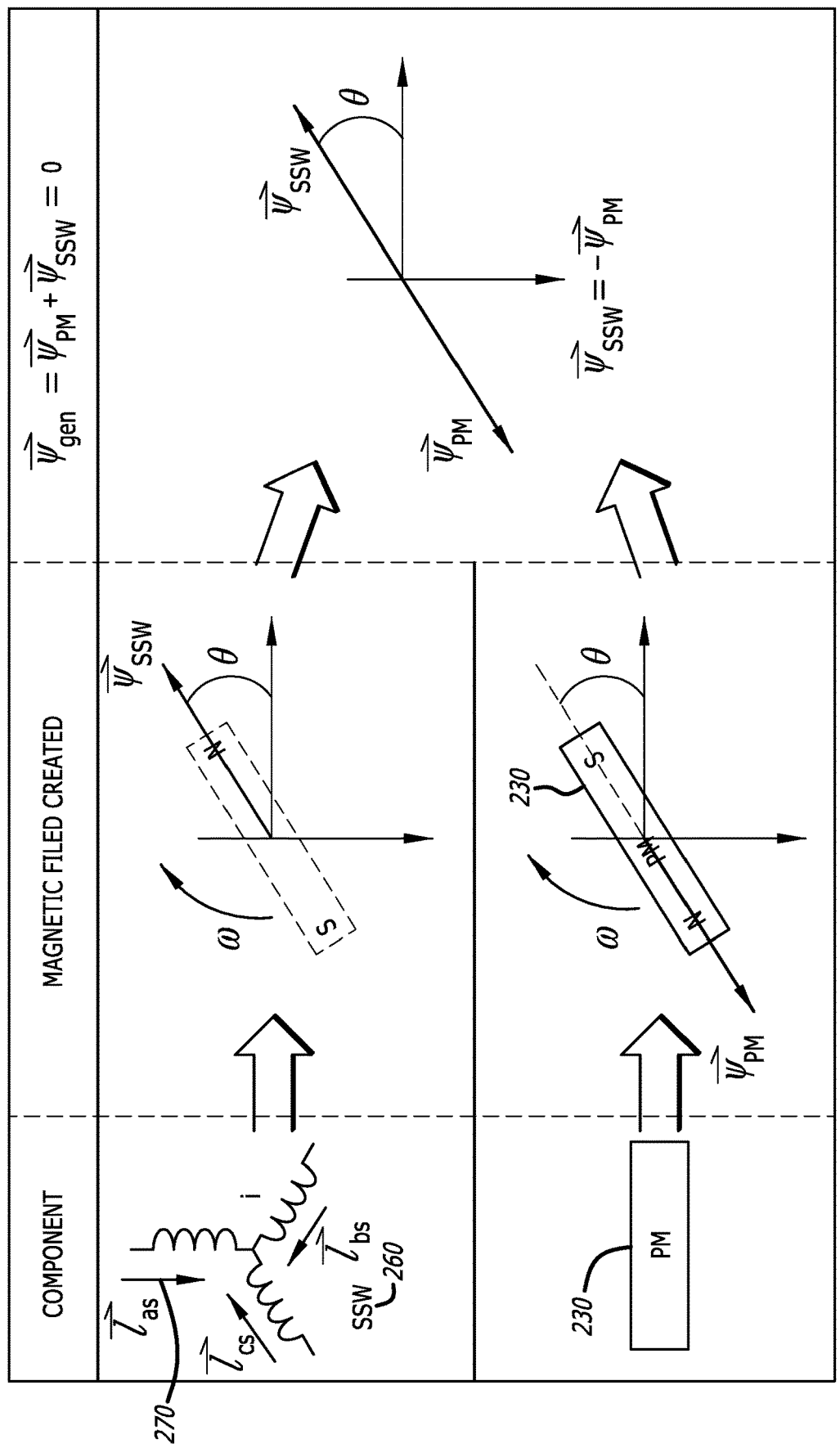
FIG. 4B is a table showing how the magnetic field ($\vec{\psi}_{SSW}$) generated by the stator secondary windings (SSW) of the disclosed permanent magnet synchronous generator (PMSG) of FIG. 2 can counteract the magnet field ($\vec{\psi}_{PM}$) of the permanent magnet (PM) to provide for short circuit protection, in accordance with at least one embodiment of the present disclosure.

FIG. 4B is a table showing how the magnetic field ($\vec{\psi}_{SSW}$) generated by the stator secondary windings (SSW) 260 of the disclosed permanent magnet synchronous generator (PMSG) 200 of FIG. 2 can counteract the magnet field ($\vec{\psi}_{PM}$) of the permanent magnet (PM) 230 to provide for short circuit protection, in accordance with at least one embodiment of the present disclosure. In this table, the first row of the table shows that the stator secondary windings 260 produce the stator secondary winding magnetic field ($\vec{\psi}_{SSW}$), and the second row of the table shows how the permanent magnet 230 produces the permanent magnet field ($\vec{\psi}_{PM}$). The permanent magnetic field ($\vec{\psi}_{PM}$) is the flux linkage phasor of the permanent magnet 230, where w is the rotor speed and θ is the rotor position angle.

The right column of the table shows how a stator secondary winding magnetic field ($\vec{\psi}_{SSW}$), which is equal in size and opposite in phase than the permanent magnet field ($\vec{\psi}_{PM}$) (i.e. $\vec{\psi}_{SSW} = -\vec{\psi}_{PM}$), counteracts the permanent magnet field ($\vec{\psi}_{PM}$) such that the overall magnetic field ($\vec{\psi}_{gen}$) of the PMSG 200 is equal to zero (0) (i.e. $\vec{\psi}_{gen} = \vec{\psi}_{PM} + \vec{\psi}_{SSW} = 0$).

Figure 5:
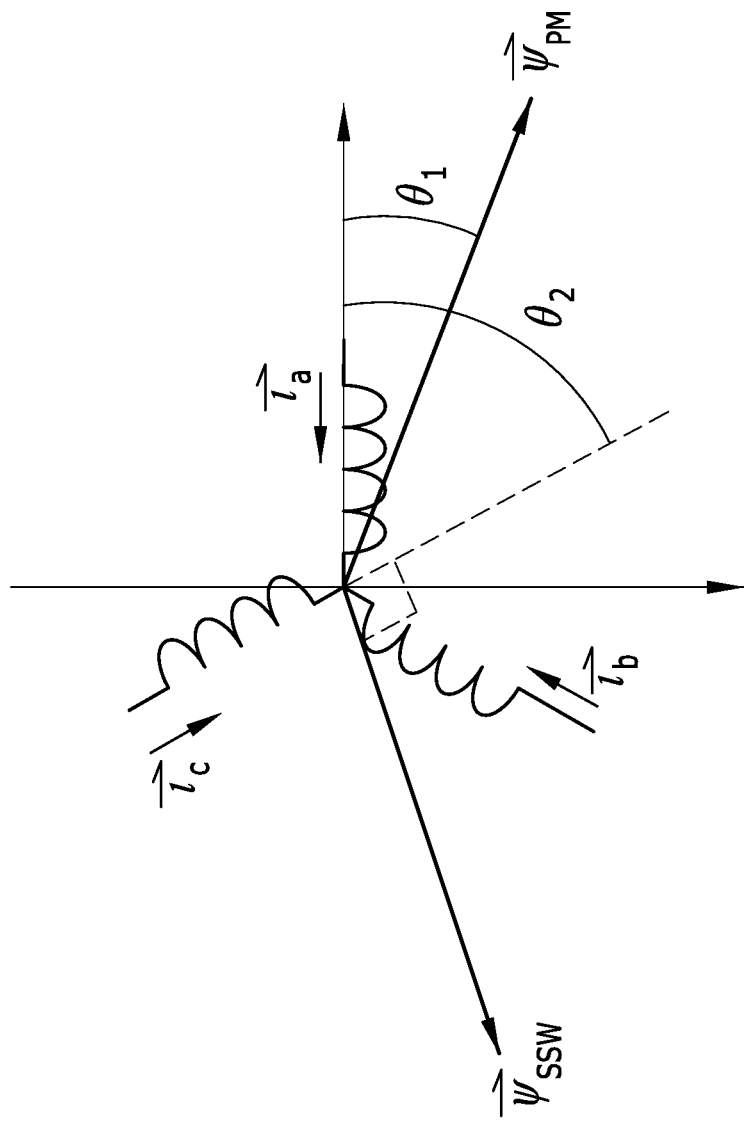
FIG. 5 is a graph showing an exemplary excitation magnetic field ($\vec{\psi}_{PM}$) generated by the permanent magnet (PM) and an exemplary excitation magnetic field ($\vec{\psi}_{SSW}$) generated by the stator secondary windings (SSW) of the disclosed permanent magnet synchronous generator (PMSG) of FIG. 2, in accordance with at least one embodiment of the present disclosure.

FIG. 5 is a graph showing an exemplary excitation magnetic field ($\vec{\psi}_{PM}$) generated by the permanent magnet (PM) 230 and an exemplary excitation magnetic field ($\vec{\psi}_{SSW}$) generated by the stator secondary windings (SSW) 260 of the disclosed permanent magnet synchronous generator (PMSG) 200 of FIG. 2, in accordance with at least one embodiment of the present disclosure. The following equations, which are related to FIG. 5, show formulas regarding how the magnetic field ($\vec{\psi}_{SSW}$) generated by the stator secondary windings 260 is mathematically related to the magnetic field ($\vec{\psi}_{PM}$) generated by the permanent magnet 230.

The specific example given in the formulas below shows how to calculate the three-phase currents (e.g., the secondary currents) 270 drawn by the stator secondary windings 260 to cause the stator secondary windings 260 to generate magnetic field ($\vec{\psi}_{SSW}$) that counteracts the magnetic field ($\vec{\psi}_{PM}$) generated by the permanent magnet 230 for short circuit protection.

The magnetic flux created by permanent magnet 230:

$$\vec{\Psi}_{PM} = |\vec{\Psi}_{PM}| \angle (\theta_1)$$

$|\vec{\Psi}_{PM}|$ is constant, and is determined by the PM material and generated construction.

$\theta_1$ is measurable.

The magnetic flux created by stator secondary windings 260:

$$\vec{i}_A = |I_{AMP}| \angle (\theta_2)$$

$$\vec{i}_B = |I_{AMP}| \angle (\theta_2 - 120)$$

$$\vec{i}_C = |I_{AMP}| \angle (\theta_2 - 240)$$

$$\vec{\psi}_{SSW} = k \cdot (\vec{i}_A + \vec{i}_B + \vec{i}_C) = k \cdot |I_{AMP}| \angle (90 + \theta_2)$$

Where, k is constant, determined by generator material and construction.

To completely counteract $\vec{\psi}_{PM}$:

$$\vec{\psi}_{SSW} |\angle(90+\theta_2) = |\vec{\psi}_{PM}| \angle(180+\theta_1)$$

Therefore:

$$|I_{AMP}| = \frac{|\vec{\psi}_{PM}|}{k}$$

$$\theta_2 = 90 + \theta_1$$

Finally, the controller 310, of the three-phase power source 300, will command the plurality of switches (e.g., six switches) 320, of the three-phase power source 300, to inject three-phase currents (e.g., secondary currents) 270 into the stator secondary windings 260 of the PMSG 200 using following equations, together referred to as Equation 1:

$$\vec{i}_A = \frac{|\vec{\psi}_{PM}|}{k} \angle(90 + \theta_1)$$

$$\vec{i}_B = \frac{|\vec{\psi}_{PM}|}{k} \angle(90 + \theta_1 - 120)$$

$$\vec{i}_C = \frac{|\vec{\psi}_{PM}|}{k} \angle(90 + \theta_1 - 240)$$

It should be noted that the formulas above (with slight modifications) may be used to calculate the three-phase currents (e.g., secondary currents) 270 to be drawn by the stator secondary windings 260 to cause the stator secondary windings 260 to generate a magnetic field ($\vec{\psi}_{SSW}$) that adds to or subtracts from the magnetic field ($\vec{\psi}_{PM}$) generated by the permanent magnet 230 for magnetic field strengthening or weakening, respectively.

Figure 6A:
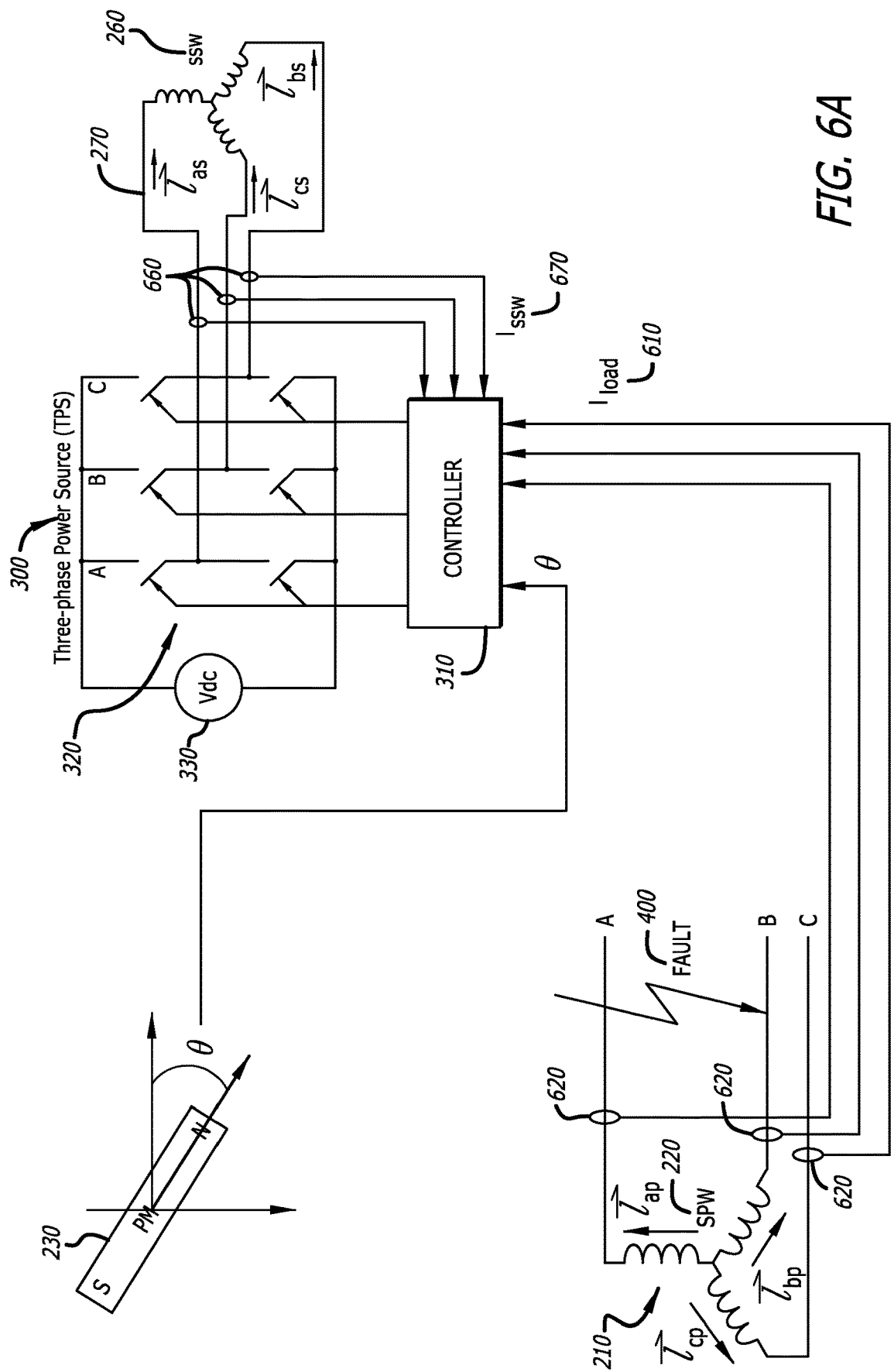
FIG. 6A is a diagram showing the disclosed system for stator secondary windings (SSW) to modify a permanent magnet (PM) field of a permanent magnet synchronous generator (PMSG), in accordance with at least one embodiment of the present disclosure.

FIG. 6A is a diagram showing the disclosed system for stator secondary windings (SSW) 260 to modify a permanent magnet (PM) field ($\vec{\psi}_{PM}$) of a permanent magnet synchronous generator (PMSG) 200, in accordance with at least one embodiment of the present disclosure. In this figure, the three-phase power source (TPS) 300 comprises a controller 310, a plurality of switches (e.g., six switches) 320, and a voltage source (e.g., a direct current power source (Vdc)) 330. In one or more embodiments, the switches 320 form an inverter.

Figure 6B:
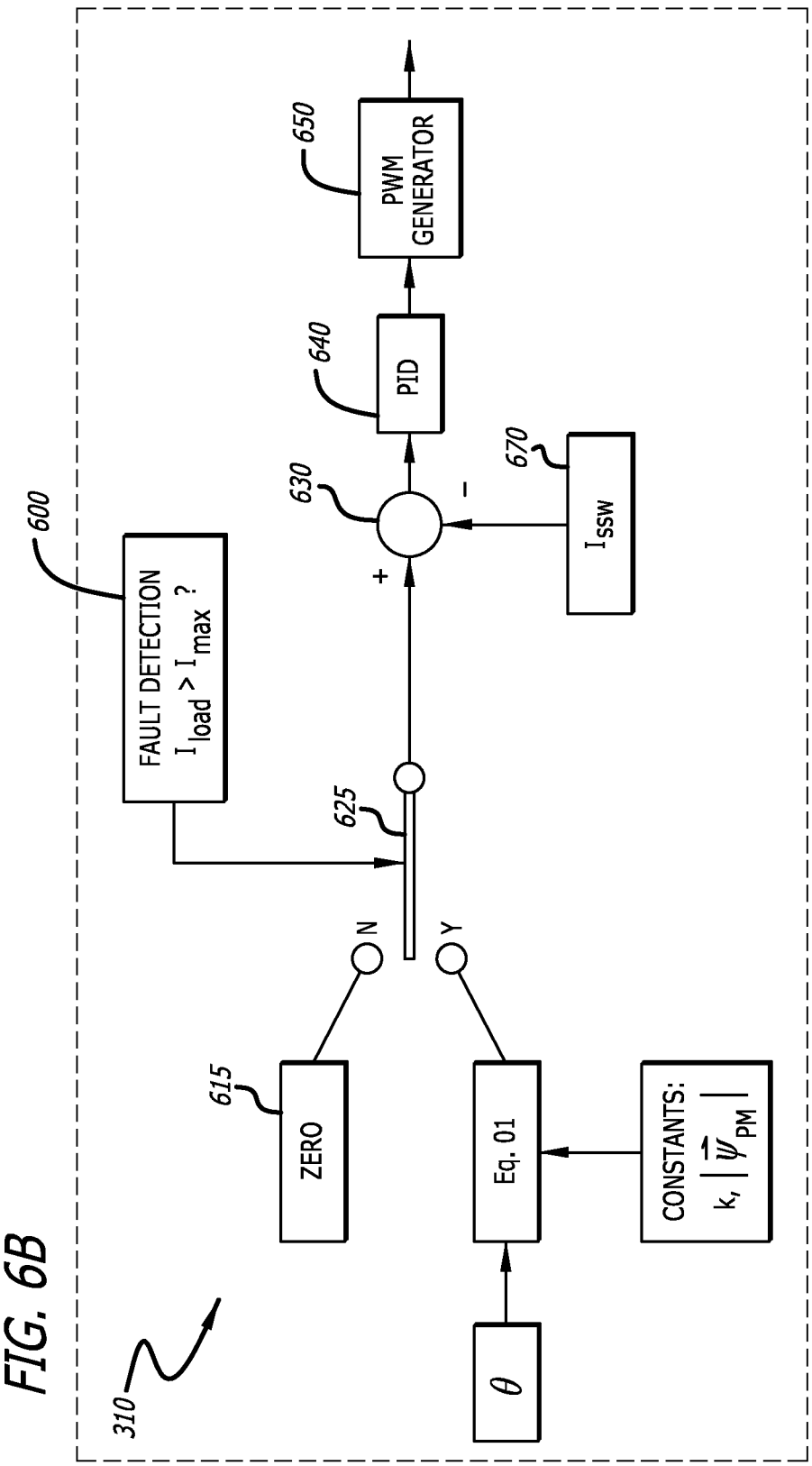
FIG. 6B is a functional diagram for the controller of the disclosed system for stator secondary windings (SSW) to modify a permanent magnet (PM) field of a permanent magnet synchronous generator (PMSG) of FIG. 6A, in accordance with at least one embodiment of the present disclosure.

FIG. 6B is a functional diagram for the controller 310 of the disclosed system for stator secondary windings (SSW) 260 to modify a permanent magnet (PM) field ($\vec{\psi}_{PM}$) of a permanent magnet synchronous generator (PMSG) 200 of FIG. 6A, in accordance with at least one embodiment of the present disclosure.

Referring to FIGS. 6A and 6B, during operation of the three-phase power source 300, primary sensors (e.g., current transducers) 620 sense the three-phase currents (e.g., primary currents) 210 generated by the stator primary windings 220. The primary sensors 620 then generate primary current signals ($I_{load}$) (i.e. measurements of the primary currents) 610 based on the sensed three-phase currents (e.g., primary currents) 210.

Also, during operation, secondary sensors (e.g., current transducers) 660 sense the three-phase currents (e.g., secondary currents) 270 drawn by the stator secondary windings 260. The secondary sensors 660 then generate secondary current signals ($I_{SSW}$) (i.e. measurements of the secondary currents) 670 based on the sensed three-phase currents (e.g., secondary currents) 270.

While the voltage source 330 supplies voltage, during operation, the controller receives the primary current signals ($I_{load}$) 610 from the primary sensors (e.g., current transducers) 620, receives the secondary current signals ($I_{SSW}$) 670 from the secondary sensors (e.g., current transducers) 660, and receives the rotor position angle θ of the permanent magnet 230.

A comparator 600 of the controller 310 compares the primary current signals ($I_{load}$) 610 to predetermined maximum currents ($I_{max}$) to determine if $I_{load}$ 610 is greater than $I_{max}$. If the comparator 600 determines that $I_{load}$ 610 is not greater than $I_{max}$, this determination indicates that the PMSG 200 is not experiencing a short circuit fault 400, and the comparator outputs a signal (e.g., a "0" signal) to switch a switch 620 of the controller 310 to a "No" position (e.g., a first position). After the switch 620 is switched to the "No" position, at least one processor(s) (not shown) of the controller 310 causes the controller 310 to do nothing (i.e. zero) 610 other than to simply repeat the process of the comparator 600 comparing the primary current signals ($I_{load}$) 610 to predetermined maximum currents ($I_{max}$) to determine if $I_{load}$ 610 is greater than $I_{max}$.

However, if the comparator 600 determines that $I_{load}$ 610 is greater than $I_{max}$, this indicates that the PMSG 200 is experiencing a short circuit fault 400, and the comparator outputs a signal (e.g., a "1" signal) to switch the switch 620 to a "Yes" position (i.e. a second position). After the switch 620 is switched to the "Yes" position, the processor(s) of the controller 310 uses the formulas in Equation 1 above along with the rotor position angle θ of the permanent magnet 230 to calculate three-phase currents (e.g., calculated secondary currents) to be drawn by the stator secondary windings 260 to cause the stator secondary windings 260 to generate a magnetic field ($\vec{\psi}_{SSW}$) that counteracts the magnetic field ($\vec{\psi}_{PM}$) generated by the permanent magnet 230 for short circuit protection.

It should be noted that although the functional diagram of FIG. 6B specifies the use of the formulas of Equation 1, in other embodiments, slight modifications to the formulas of Equation 1 may be used instead of the formulas of Equation 1 to generate a stator secondary winding magnetic field ($\vec{\psi}_{SSW}$) to strengthen or to weaken the magnetic field ($\vec{\psi}_{PM}$) generated by the permanent magnet 230.

A comparator 600 of the controller 310 compares the primary current signals ($I_{load}$) 610 to predetermined maximum currents ($I_{max}$) to determine if $I_{load}$ 610 is greater than $I_{max}$. If the comparator 600 determines that $I_{load}$ 610 is not greater than $I_{max}$, this determination indicates that the PMSG 200 is not experiencing a short circuit fault 400, and the comparator outputs a signal (e.g., a "0" signal) to switch a switch 625 of the controller 310 to a "No" position (e.g., a first position). After the switch 625 is switched to the "No" position, at least one processor(s) (not shown) of the controller 310 causes the controller 310 to do nothing (i.e. zero) 615 other than to simply repeat the process of the comparator 600 comparing the primary current signals ($I_{load}$) 610 to predetermined maximum currents ($I_{max}$) to determine if $I_{load}$ 610 is greater than $I_{max}$.

However, if the comparator 600 determines that $I_{load}$ 610 is greater than $I_{max}$, this indicates that the PMSG 200 is experiencing a short circuit fault 400, and the comparator outputs a signal (e.g., a "1" signal) to switch the switch 625 to a "Yes" position (i.e. a second position). After the switch 625 is switched to the "Yes" position, the processor(s) of the controller 310 uses the formulas in Equation 1 above along with the rotor position angle θ of the permanent magnet 230 to calculate three-phase currents (e.g., calculated secondary currents) to be drawn by the stator secondary windings 260 to cause the stator secondary windings 260 to generate a magnetic field ($\vec{\psi}_{SSW}$) that counteracts the magnetic field ($\vec{\psi}_{PM}$) generated by the permanent magnet 230 for short circuit protection.

Figure 7:
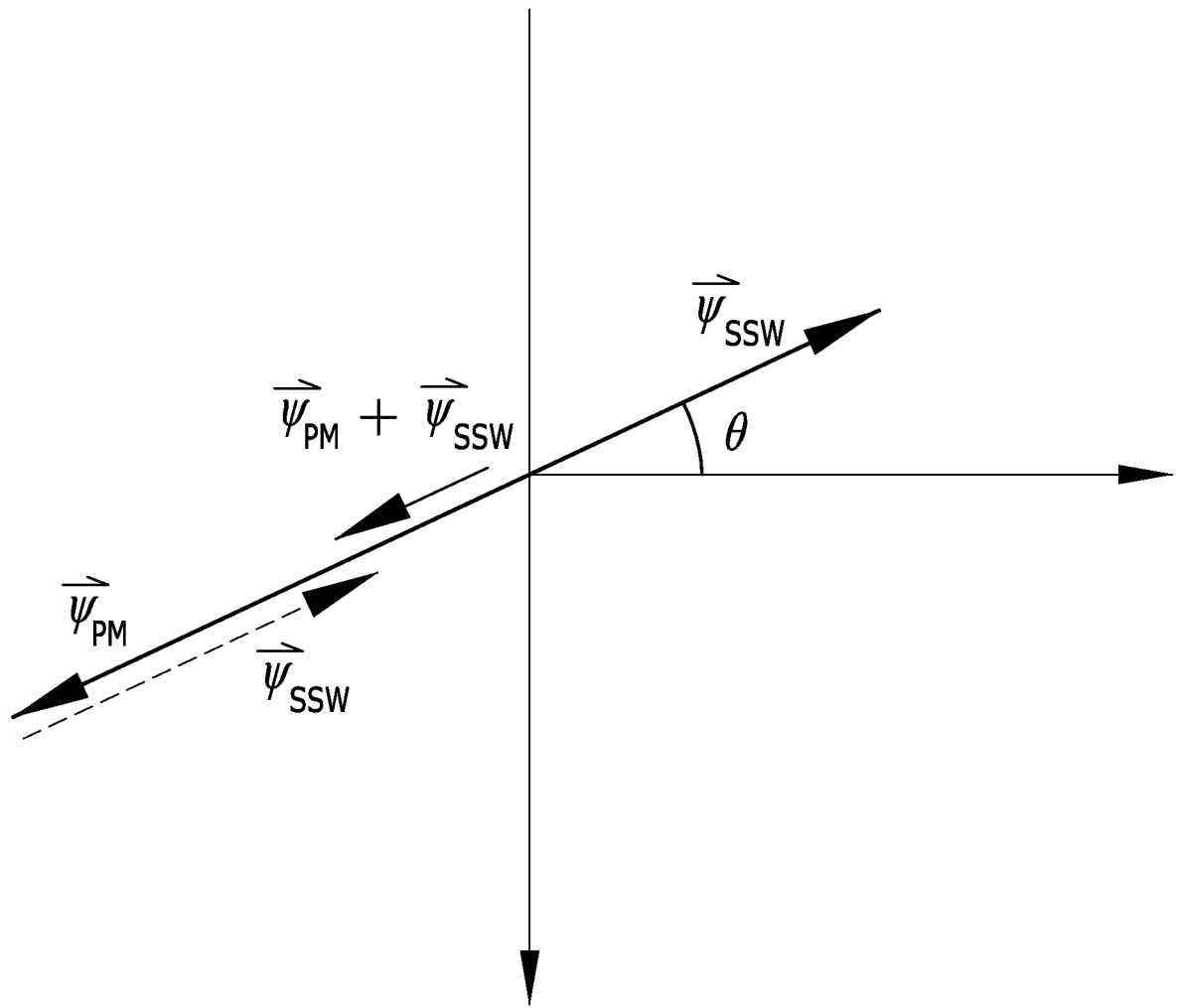
FIG. 7 is a graph showing how the magnetic field ($\vec{\psi}_{SSW}$) generated by the stator secondary windings (SSW) of the disclosed permanent magnet synchronous generator (PMSG) of FIG. 2 can weaken the magnet field ($\vec{\psi}_{PM}$) of the permanent magnet (PM), in accordance with at least one embodiment of the present disclosure.

FIG. 7 is a graph showing how the magnetic field ($\vec{\psi}_{SSW}$) generated by the stator secondary windings (SSW) of the disclosed permanent magnet synchronous generator (PMSG) of FIG. 2 can weaken the magnet field ($\vec{\psi}_{PM}$) of the permanent magnet (PM), in accordance with at least one embodiment of the present disclosure. This graph shows a stator secondary winding magnetic field ($\vec{\psi}_{SSW}$), which is less than in size and opposite in phase than the permanent magnet field ($\vec{\psi}_{PM}$). The stator secondary winding magnetic field ($\vec{\psi}_{SSW}$) has the effect of weakening the permanent magnet field ($\vec{\psi}_{PM}$) and, as such, the overall magnetic field ($\vec{\psi}_{gen}$) of the PMSG 200 is weakened.

Figure 8:
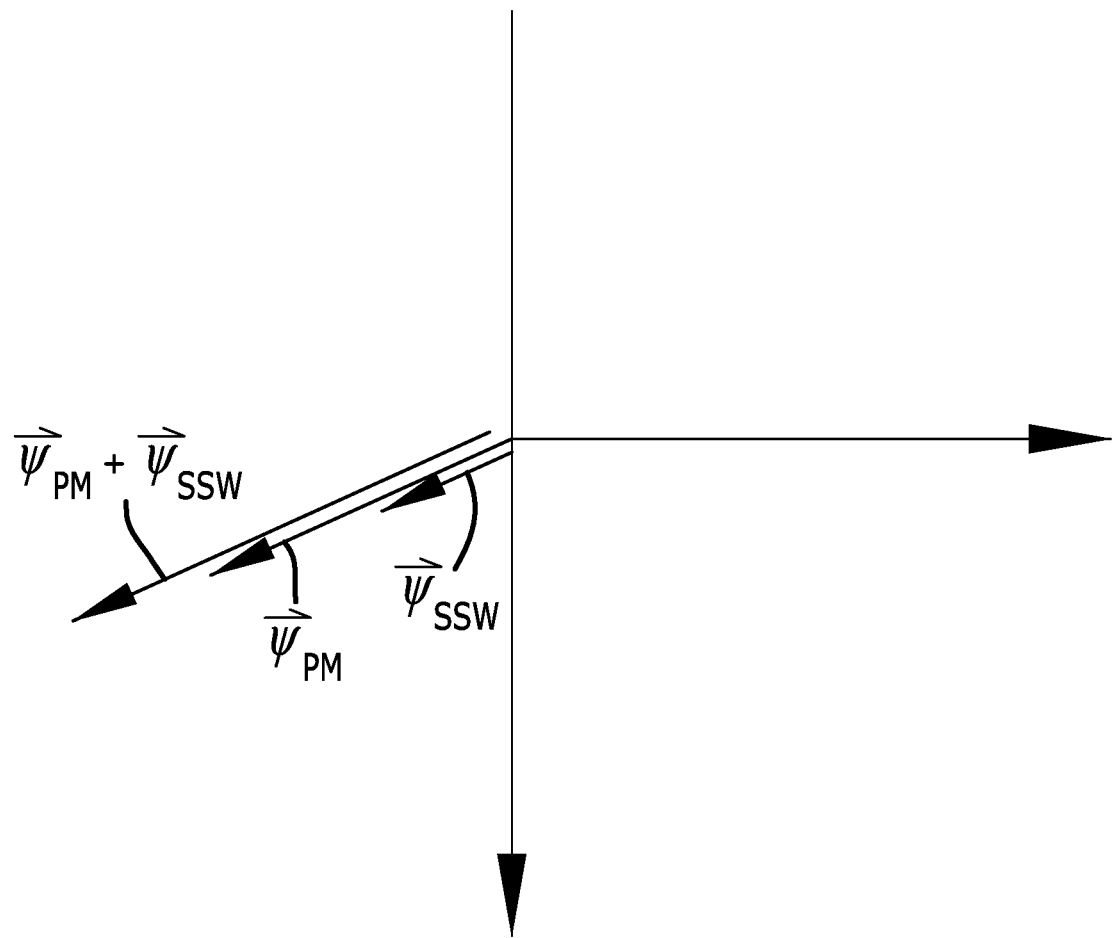
FIG. 8 is a graph showing how the magnetic field ($\vec{\psi}_{SSW}$) generated by the stator secondary windings (SSW) of the disclosed permanent magnet synchronous generator (PMSG) of FIG. 2 can strengthen the magnet field ($\vec{\psi}_{PM}$) of the permanent magnet (PM), in accordance with at least one embodiment of the present disclosure.

FIG. 8 is a graph showing how the magnetic field ($\vec{\psi}_{SSW}$) generated by the stator secondary windings (SSW) of the disclosed permanent magnet synchronous generator (PMSG) of FIG. 2 can strengthen the magnet field ($\vec{\psi}_{PM}$) of the permanent magnet (PM), in accordance with at least one embodiment of the present disclosure. This graph shows a stator secondary winding magnetic field ($\vec{\psi}_{SSW}$), which is less than in size and equal in phase to the permanent magnet field ($\vec{\psi}_{SSW}$). The stator secondary winding magnetic field ($\vec{\psi}_{SSW}$) has the effect of strengthening the permanent magnet field ($\vec{\psi}_{PM}$) and, as such, the overall magnetic field ($\vec{\psi}_{gen}$) of the PMSG 200 is strengthened.

It should be noted that in other embodiments, the stator secondary winding magnetic field ($\vec{\psi}_{SSW}$) may be less than or greater than in size and equal in phase to the permanent magnet field ($\vec{\psi}_{PM}$) to strengthen the permanent magnet field ($\vec{\psi}_{PM}$), as well as the overall magnetic field ($\vec{\psi}_{gen}$) of the PMSG 200.

Figure 9:
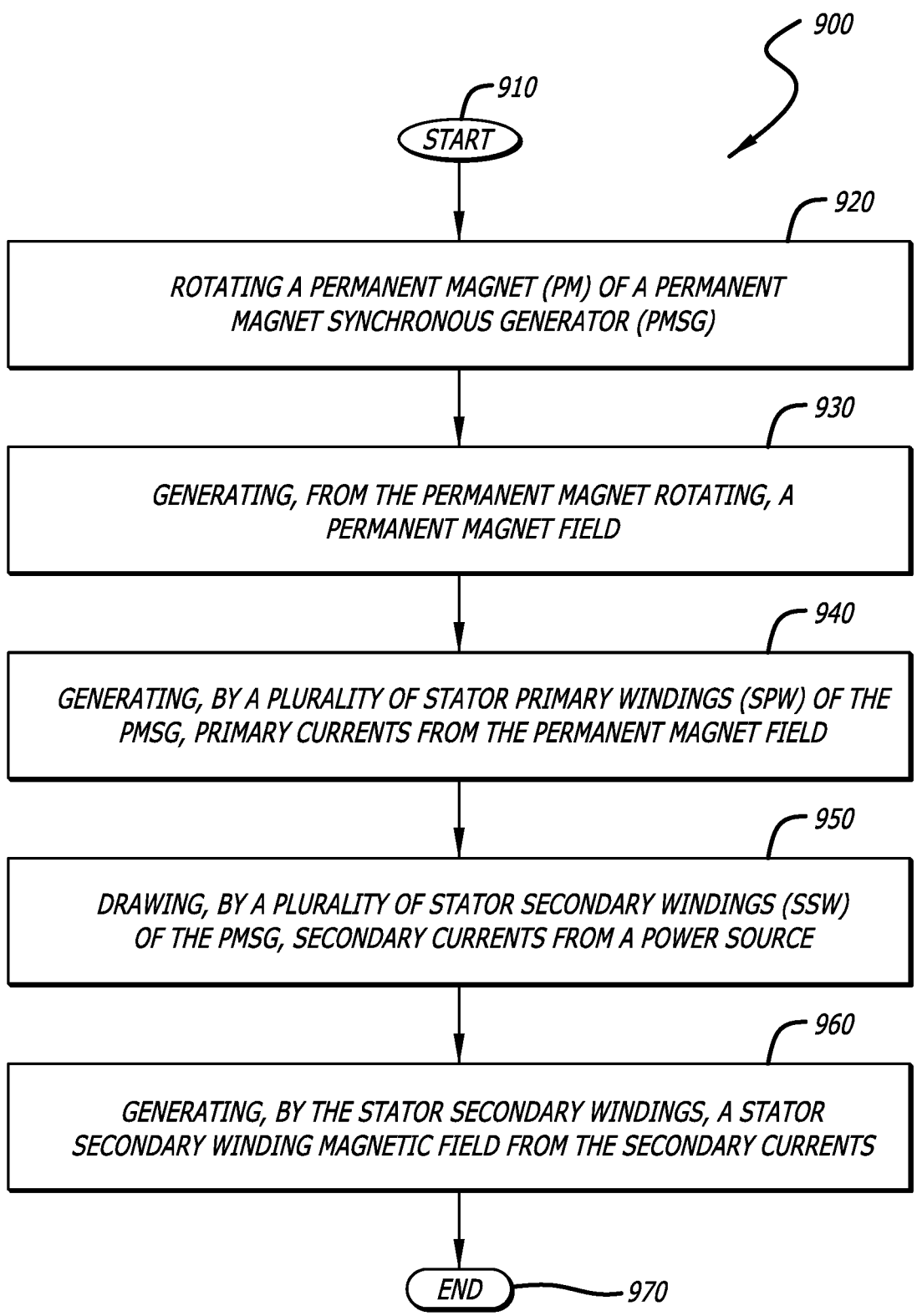
FIG. 9 is a flow chart showing the disclosed method for stator secondary windings (SSW) to modify a permanent magnet (PM) field of a permanent magnet synchronous generator (PMSG), in accordance with at least one embodiment of the present disclosure.

FIG. 9 is a flow chart showing the disclosed method 900 for stator secondary windings (SSW) to modify a permanent magnet (PM) field of a permanent magnet synchronous generator (PMSG), in accordance with at least one embodiment of the present disclosure. At the start 910 of the method, a permanent magnet (PM), of the PMSG, is rotated 920. The permanent magnet generates a permanent magnet field 930. The permanent magnet field radiates through a plurality of stator primary windings (SPW) of the PMSG. The stator primary windings generate primary currents from the permanent magnet field 940. Then, a plurality of stator secondary windings (SSW), of the PMSG, draws secondary currents from a power source 950. The plurality of stator secondary windings generates a stator secondary winding magnetic field from the secondary currents 960. The permanent magnet field and the stator secondary winding magnetic field together create an overall magnetic field for the PMSG. Then, the method 900 ends 970.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system comprising:
    a controller configured to switch at least one of a plurality of switches of a power source based on primary current signals received from primary sensors of stator primary windings (SPW) of a permanent magnet synchronous generator (PMSG), and a rotor position angle of a permanent magnet (PM) of the PMSG, and
    wherein the PM is configured to rotate and to generate a permanent magnet field that facilitates generation of primary currents in the SPW;
    the PMSG comprising a plurality of bars, wherein the SPW and stator secondary windings (SSW) are provided on the plurality of bars such that each of the bars comprises a portion of the SPW and a portion of the SSW;
    the plurality of switches configured to generate variable secondary currents; and
    the SSW configured to draw the variable secondary currents from the power source, and to generate a stator secondary winding magnetic field from the variable secondary currents,
    wherein the controller is configured to:
        determine, from the primary current signals, whether any of the primary currents is excessive to indicate a fault, and
        upon the controller determining, from the primary current signals, that at least one of the primary currents is excessive to indicate a fault, operate the plurality of switches to cause the permanent magnet field and the stator secondary winding magnetic field together to create an overall magnetic field for the PMSG of a smaller amplitude than the permanent magnet field, the smaller amplitude acting to reduce the primary currents, wherein the controller is configured to switch at least one of the plurality of switches based on the primary current signals, secondary current signals received from secondary sensors of stator secondary windings (SSW) of the PMSG, and the rotor position angle of the permanent magnet (PM).

2. The system of claim 1, wherein the stator secondary winding magnetic field weakens the permanent magnet field.

3. The system of claim 1, wherein the permanent magnet is mounted onto a rotor, and the smaller amplitude is zero.

4. The system of claim 1, wherein the power source is a three-phase power source (TPS), and the stator secondary winding magnetic field counteracts the permanent magnet field.

5. The system of claim 1, wherein the variable secondary currents are three-phase sinusoidal currents or three-phase quasi-sinusoidal currents.

6. The system of claim 1, wherein:
the power source comprises the controller, the plurality of switches, and a direct current (DC) power source.

7. The system of claim 6, wherein the fault is a short circuit fault.

8. The system of claim 1, wherein the controller is configured to generate a plurality of pulse sequences, when any one of the primary currents is excessive.

9. A method of using the system of claim 1, the method comprising:
rotating the permanent magnet (PM) of the permanent magnet synchronous generator (PMSG);
generating, from the PM rotating, the permanent magnet field,
wherein the permanent magnet field couples through the plurality of stator primary windings (SPW) of the PMSG;
generating, by the SPW, the primary currents from the permanent magnet field;
receiving, by the controller, the primary current signals from the primary sensors of the SPW, and the rotor position angle of the PM;
switching, by the controller, at least one of the plurality of switches of the power source based on the primary current signals and the rotor position angle;
generating, by the plurality of switches, the variable secondary currents;
drawing, by the plurality of SSW of the PMSG, the variable secondary currents from the power source;
determining by the controller, from the primary current signals, whether any of the primary currents is excessive to indicate a fault; and
upon the controller determining, from the primary current signals, that at least one of the primary currents is excessive to indicate a fault, operating the plurality of switches to cause the SSW to generate the stator secondary winding magnetic field from the variable secondary currents, wherein the permanent magnet field and the stator secondary winding magnetic field together create an overall magnetic field for the PMSG of a smaller amplitude than the permanent magnet field, the smaller amplitude acting to reduce the primary currents;
wherein the controller switches the at least one of the plurality of switches based on the primary current signals, the secondary current signals received from secondary sensors of the stator secondary windings (SSW) of the PMSG, and the rotor position angle of the permanent magnet (PM).

10. The method of claim 9, wherein the stator secondary winding magnetic field counteracts the permanent magnet field.

11. The method of claim 9, wherein the PM is mounted onto a rotor, and the smaller amplitude is zero.

12. The method of claim 9, wherein the primary currents are three-phase currents, and the stator secondary winding magnetic field weakens the permanent magnet field.

13. The method of claim 9, wherein the power source is a three-phase power source (TPS), and the stator secondary winding magnetic field strengthens the permanent magnet field.

14. The method of claim 9, wherein the variable secondary currents are three-phase sinusoidal currents or three-phase quasi-sinusoidal currents.

15. The method of claim 9, wherein the power source comprises the controller, the plurality of switches, and a direct current (DC) power source.

16. The method of claim 15, wherein the switches form an inverter.

17. The method of claim 9, wherein the fault is a short circuit fault.

18. The method of claim 17, wherein the method further comprises generating, by the controller, a plurality of pulse sequences, when any of the primary currents is excessive to indicate a fault.

19. The method of claim 18, wherein the method further comprises switching, the plurality of switches, by using the pulse sequences to produce the variable secondary currents.

20. A controller for a permanent magnet synchronous generator (PMSG), the controller comprising:
a comparator operable (1) to analyze primary current signals ($I_{load}$), which are measurements of primary currents generated by a plurality of stator primary windings (SPW) of the PMSG, to determine whether the primary current signals ($I_{load}$) are excessive to indicate a fault, (2) to output a signal to switch a switch to a first position, when the comparator determines that the primary current signals ($I_{load}$) are not excessive, and (3) to output a signal to switch the switch to a second position, when the comparator determines that the primary current signals ($I_{load}$) are excessive;
at least one processor operable (1) to cause the comparator to continue to perform the comparison, when the switch is switched to the first position, and to (2) determine calculated secondary currents to be drawn by a plurality of stator secondary windings (SSW) of the PMSG to cause the stator secondary windings to generate a stator secondary winding magnetic field to reduce an amplitude of an overall magnetic field of the PMSG to a value smaller than the permanent magnet field, when the switch is switched to the second position,
wherein the SPW and the SSW are provided on a plurality of bars of the PMSG such that each of the bars comprises a portion of the SPW and a portion of the SSW;
a subtractor operable to subtract secondary current signals ($I_{ssw}$), which are measurements of secondary currents drawn by the stator secondary windings, from the calculated secondary currents to determine a difference value;

a proportional-integral-derivative controller (PID) operable to apply an accurate and responsive correction to the difference value to generate a corrected difference value; and a pulse width modulation (PWM) generator operable to generate at least one pulse sequence based on the corrected difference value, wherein the at least one pulse sequence is used to generate the stator secondary winding magnetic field of the PMSG;

wherein the controller is configured to switch at least one of the plurality of switches based on the primary current signals, the secondary current signals received from secondary sensors of stator secondary windings (SSW) of the PMSG, and the rotor position angle of the permanent magnet (PM).

* * * * *